United States Patent [19]

Borchert et al.

[11] 4,105,828

[45] Aug. 8, 1978

[54] LOW-CURRENT CONTACT CONSTRUCTION

[75] Inventors: Lothar Borchert, Haar; Karl-Jörg Stenzel, Söcking, both of Fed. Rep. of Germany

[73] Assignee: Siemens Aktiengesellschaft, Munich, Fed. Rep. of Germany

[21] Appl. No.: 763,104

[22] Filed: Jan. 27, 1977

[30] Foreign Application Priority Data

Feb. 2, 1976 [DE] Fed. Rep. of Germany ....... 2604291

[51] Int. Cl.[2] ........................ H01H 1/02; B32B 15/04

[52] U.S. Cl. .................................... 428/665; 200/268; 200/269; 335/196; 428/661; 428/663; 428/670; 428/673; 428/680; 428/926; 428/929; 428/941

[58] Field of Search ............... 428/670, 672, 673, 663, 428/665, 655, 660, 661, 941, 929, 926; 200/268, 269; 335/196

[56] References Cited

U.S. PATENT DOCUMENTS

| | | | |
|---|---|---|---|
| 3,249,728 | 5/1966 | Sasamoto et al. | 200/269 |
| 3,671,702 | 1/1972 | Penczek | 200/269 |

FOREIGN PATENT DOCUMENTS

| | | | |
|---|---|---|---|
| 1,564,069 | 4/1970 | Fed. Rep. of Germany | 428/929 |
| 2,363,444 | 7/1975 | Fed. Rep. of Germany | 335/196 |

*Primary Examiner*—Arthur J. Steiner
*Attorney, Agent, or Firm*—Schuyler, Birch, Swindler, McKie and Beckett

[57] ABSTRACT

A low-current contact structure formed on a contact member or substrate of various layers is described. A layer of refractory material is connected via a layer of easily diffusive metal with a layer of noble metal through diffusion annealing.

16 Claims, No Drawings

LOW-CURRENT CONTACT CONSTRUCTION

BACKGROUND OF THE INVENTION

The invention relates to a contact structure, more particularly for telecommunication relay contacts and the like, which is deposited on a substrate of suitable conductive and/or magnetizable material in the region of the contact point.

In communication engineering, electric contacts are employed for switching systems, transmission systems, as well as control and regulating systems, the latter requiring a type of contact generally known as low-current contacts. Since the electric functions of various contacts are variously interconnected so that the function of a contact is of importance not only for the circuit of which it is a part, but also for many other circuits, the long term reliability, i.e., the capability of performing a very large number of switching processes without any deterioration, remains an important object of contact construction.

It has long been a common practice to coat the customary substrate materials from which the contact members or contact armatures are made, at the contact point, with other materials so as to positively influence, e.g., the contact resistance, the resistance to burn-up, the mechanical resistance to abrasion or the reaction with possible inert gas atmospheres. Thus, attempts have been made to deposit noble metals on a base metal substrate since the noble metal prevents the occurrence of glow or arc discharges during the operation of contacts under inert gas atmosphere. However, other problems arise since, due to the smaller mechanical hardness of the noble metal, such as contact sticking, bonding and welding appear as resulting phenomena.

Therefore, in order to achieve a specific ductility of the coating material, there has been introduced an alloy of a noble metal, such as gold, and a small percentage of a palladium metal. West German Auslegeschrift No. 1 764 233 describes the arrangement between a substrate of a magnetically soft material, such as an iron nickel alloy, and a homogeneous coating of up to about 0.02 mm thick gold-palladium alloy containing from 5 to 35% by weight of palladium, residual gold, an interlayer of a refractory material from the group molybdenum, tungsten, rhenium, a carbide or boride of said metals, tantalum carbide or tantalum boride. In this case, there is an interaction between the coating of the gold-palladium alloy and the interlayer of the refractory metal such that the above mentioned sticking action which often occurs when making contact with the switching contacts that contain a gold palladium coating but no interlayer is reduced considerably.

Nevertheless, it is considered a disadvantage that the individual layers of such contacts, though they exhibit an adequately firm surface for switching functions, do not possess an adequate adhesive power. After a multiplicity of purely mechanical switching processes, the noble metal layers come out of the interlayer. The detached covering layers reduce the contact gap, causing the dielectric strength of the contact to diminish. As soon as the noble metal layer is completely detached, switching occurs on pure molybdenum; this causes the contact resistance to increase excessively.

It is an object of the present invention to construct contact layers in such a way that the mutual adhesiveness is improved without deleteriously affecting the desirable properties described hereinabove.

SUMMARY OF THE INVENTION

The foregoing and other objects are achieved, according to the invention, in that a 0.02 to 0.08 mm thick layer of a refractory metal, e.g., rhenium, tungsten, molybdenum or their alloys are, through a diffusion annealing process, bonded with a 0.001 to 0.01 mm thick platinum or palladium layer and with a 0.005 to 0.02 mm thick gold or silver layer. This contact structure of three (3) layers, of which particularly the platinum or palladium layer adheres extremely well to the adjacent layers, shows an extraordinary stability of shape in the case of purely mechanical switching. This results from the annealing process which produces a gradual region of transition between the individual layers, the latter being advantageously arranged such that the contact structure changes from a very high-melting bottom layer to the less heat-resistant, but chemically nobler, layers. The resultant differences in hardness resulting from diffusion annealing lead to a proper stability of shape of the contact electrodes. In addition, this arrangement of contact materials shows little tendency to burn out in the presence of arc discharges and low contact resistances for different switching loads.

For contacts arranged in enclosed compartments and operated by means of magnetic excitation fluxes, magnetizable metals are preferred as the substrates for contact armatures which may be carrying current and flux simultaneously.

DETAILED DESCRIPTION OF A PREFERRED EMBODIMENT

According to a preferred embodiment of the invention, in addition to the structure described above, there may also be bonded in the manner described above a 0.006 to 0.014 mm thick layer of a refractory metal, such as rhenium, tungsten, molybdenum or their alloys with the rest of the layers.

An advantageous development of the three-layer structure consists of a 0.005 to 0.02 mm thick layer of an alloy of silver with 10 to 50% by weight of palladium in lieu of the second and third layer. Here, too, the palladium is diffused in an annealing process so as to cause the layers to adhere better to one another, while the demands made on the surface are met by the alloy component silver.

A particularly advantageous alloy of this type is a silver-palladium-copper alloy in the ratio 65:30:5%, which is likewise deposited as a 0.005 to 0.02 mm thick layer instead of the second and third layer mentioned above. The copper added in this case controls together with the palladium the hardness of the top layer of noble metal, which is essential for the mechanical switching performance. Here, too, the palladium is the component that improves the mutual adhesion of the layers as a result of the diffusion annealing.

The contacts produced in this manner may be cut to the desired size and soldered onto the contact point region of the substrate. This type of attachment is recommended for substrates, i.e., contact members of e.g. nickel silver or a copper nickel alloy, whose stability cannot withstand an annealing process. The individual layers may, however, also be arranged directly in the region of the contact point of a substrate in the sequence mentioned above and bonded with one another and with the substrate by diffusion annealing. This simplified production technique is convenient for contact members of an iron nickel alloy which is preferred in the case of magnetically operable dry-reed contacts.

We claim:

1. A contact structure, more particularly for telecommunications relay contacts, said contact structure consisting of:

(a) a substrate of suitable conducting and/or magnetizable material;

(b) a first layer bonded to said substrate, said first layer composed of a refractory metal selected from the group consisting of rhenium, tungsten, molybdenum and alloys thereof, having a thickness of from 0.02 to 0.08 mm; and (c) a second layer bonded to said first layer by diffusion annealing, said second layer composed of an alloy consisting of silver and palladium having a 10 to 50% palladium content and a thickness of from 0.005 to 0.2 mm.

2. The contact structure defined in claim 1 wherein said substrate is a nickel-iron alloy.

3. The contact structure defined in claim 1 wherein said first layer is soldered to said substrate.

4. The contact structure defined in claim 1 wherein said layers are bonded to said substrate through a diffusion process.

5. A contact structure, more particularly for telecommunications relay contacts, said contact structure consisting of:

(a) a substrate of suitable conducting and/or magnetizable material;

(b) a first layer bonded to said substrate, said first layer composed of a refractory metal selected from the group consisting of rhenium, tungsten, molybdenum and alloys thereof, having a thickness of from 0.02 to 0.08 mm; and (c) a second layer bonded to said first layer by diffusion annealing, said second layer composed of an alloy consisting of silver, palladium and copper in the ratio of 65:30:5 percent by weight and having a thickness of from 0.005 to 0.02 mm.

6. The contact structure defined in claim 5 wherein said substrate is a nickel-iron alloy.

7. The contact structure defined in claim 5 wherein said first layer is soldered to said substrate.

8. The contact structure defined in claim 5 wherein said layers are bonded to said substrate through a diffusion process.

9. A contact structure, more particularly for telecommunications relay contacts, said contact structure consisting of:

(a) a substrate of suitable conducting and/or magnetizable material;

(b) a first layer bonded to said substrate, said first layer composed of a refractory metal selected from the group consisting of rhenium, tungsten, molybdenum and alloys thereof, having a thickness of from 0.006 to 0.014 mm; and (c) a second layer bonded to said first layer by diffusion annealing, said second layer composed of an alloy consisting of silver and palladium having a 10 to 50% palladium content and a thickness of from 0.005 to 0.02 mm.

10. The contact structure defined in claim 9 wherein said substrate is a nickel-iron alloy.

11. The contact structure defined in claim 9 wherein said first layer is soldered to said substrate.

12. The contact structure defined in claim 9 wherein said layers are bonded to said substrate through a diffusion process.

13. A contact structure, more particularly for telecommunications relay contacts, said contact structure consisting of:

(a) a substrate of suitable conducting and/or magnetizable material;

(b) a first layer bonded to said substrate, said first layer composed of a refractory metal selected from the group consisting of rhenium, tungsten, molybdenum and alloys thereof, having a thickness of from 0.006 to 0.014.

(c) a second layer bonded to said first layer by diffusion annealing, said second layer composed of an alloy consisting of silver, palladium and copper in the ratio of 65:30:5 percent by weight and having a thickness of from 0.005 to 0.02 mm.

14. The contact structure defined in claim 13 wherein said substrate is a nickel-iron alloy.

15. The contact structure defined in claim 13 wherein said first layer is soldered to said substrate.

16. The contact structure defined in claim 13 wherein said layers are bonded to said substrate through a diffusion process.

* * * * *